May 9, 1961  B. A. MENARIK ET AL  2,983,791
COMBINATION PORTABLE CAR WINDOW MOUNTABLE PUBLIC ADDRESS UNIT
Filed May 7, 1959  2 Sheets-Sheet 2
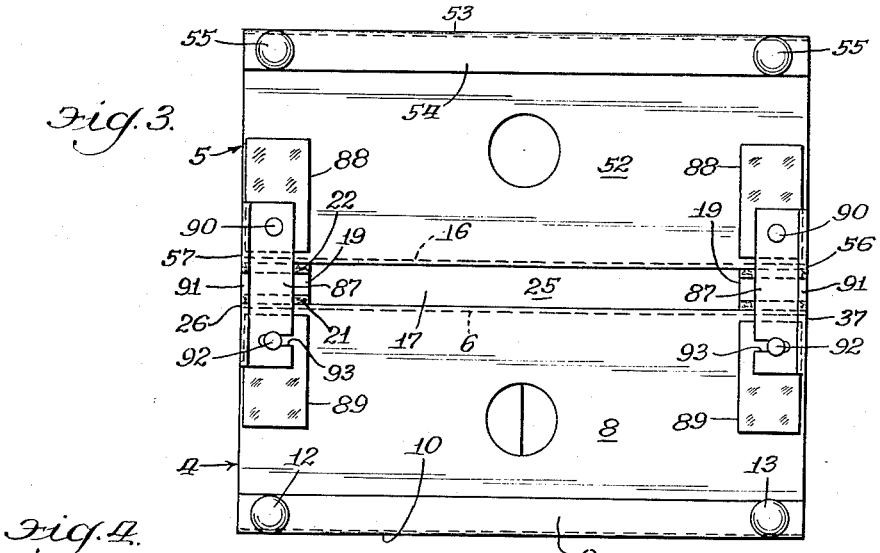
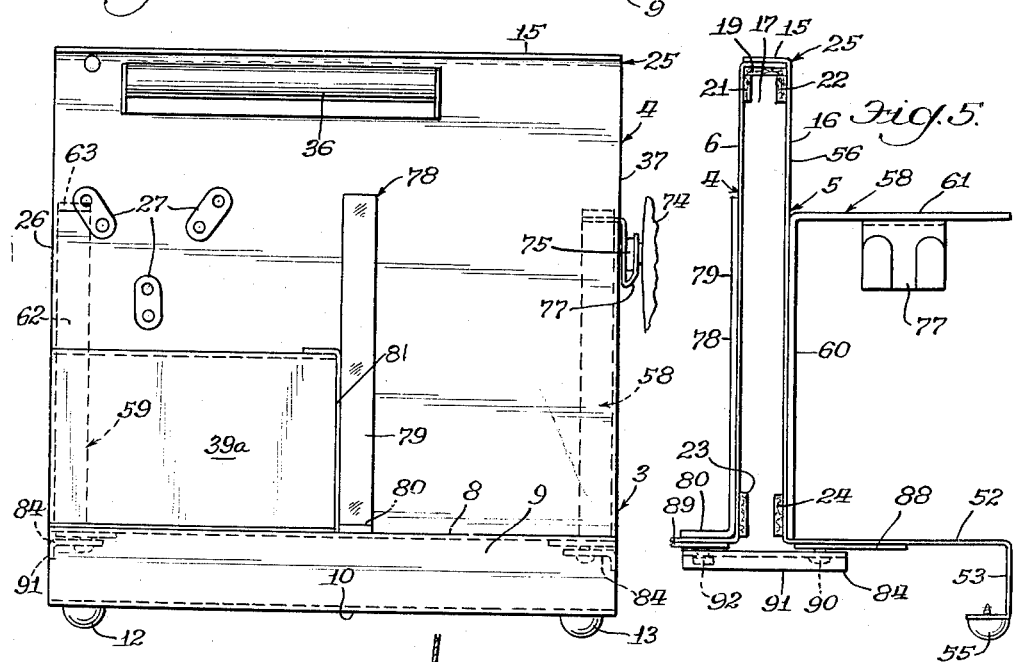
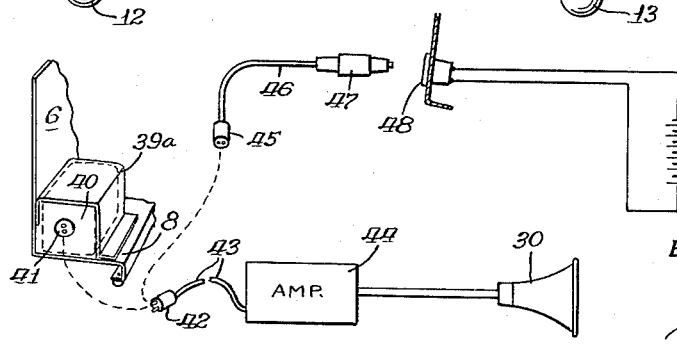
INVENTORS
Bernard A. Menarik
Eustace H. Taylor
BY
John J. Kowalik Atty.

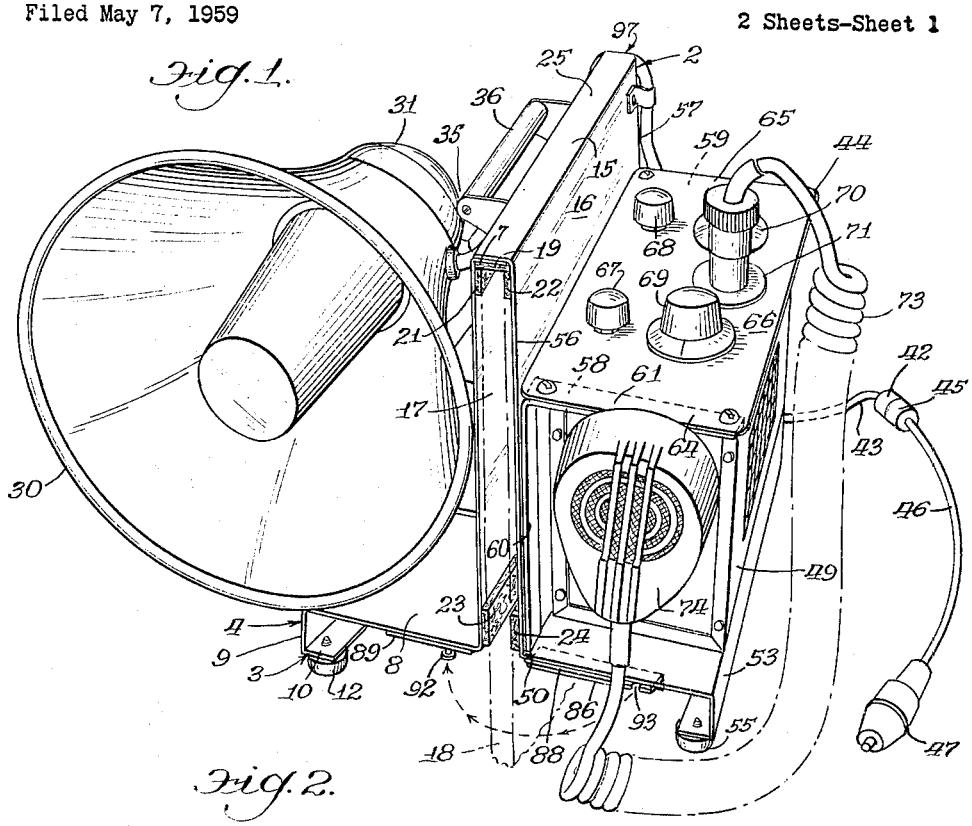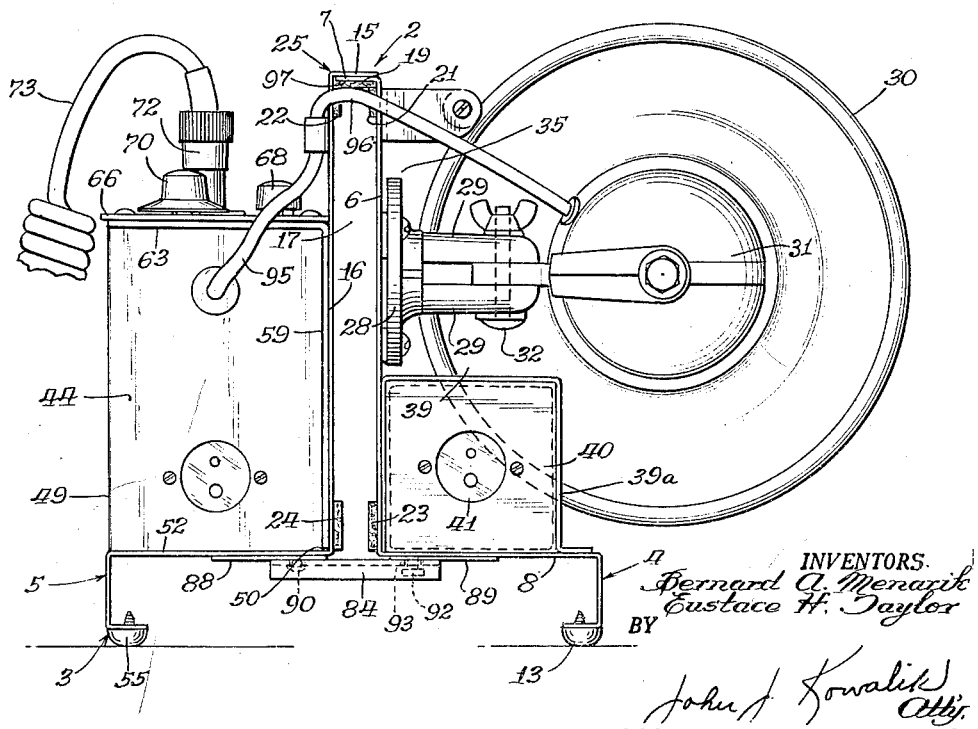

2,983,791
COMBINATION PORTABLE CAR WINDOW MOUNTABLE PUBLIC ADDRESS UNIT

Bernard A. Menarik, 8414 N. Marmora, Morton Grove, Ill., and Eustace H. Taylor, 1229 S. Batavia, Batavia, Ill.

Filed May 7, 1959, Ser. No. 811,678

7 Claims. (Cl. 179—1)

This invention relates to public address apparatus and more specifically to such apparatus of novel design which is adaptable for mounting in an automobile window or can be hand carried.

A general object of the invention is to provide a novel public address unit in which the various components are arranged in a novel compact form such as will balance across a car window and at the same time is a handy carrying unit.

A more specific object of the invention is to provide a novel chassis comprising an intermediate arch structure which provides a window-accommodating slot, and shelf-like members projecting from opposite sides of the arch structure and serving as supports for different components of the apparatus.

A still further object of the invention is to provide a novel arrangement wherein a handhold is provided on one side of the arch member adjacent to its upper end to facilitate handling of the unit either when hand carried or when being installed on the automobile window, the handhold being strategically located in a space between the narrowing portion of the speaker horn and the related side of the arch member upon which the horn is mounted to take advantage of the space afforded therebetween wherein the user's hand is conveniently accommodated.

A different object of the invention is to provide a novel latch arrangement for releasably tying the lower ends of the vertical side panels of the arch member to rigidify the chassis structure when the unit is used as a portable hand carried set.

Another object of the invention is to devise a novel chassis form on which the various components are organized to balance the unit across a car window and at the same time add to the strength of the entire structure.

These and other objects and advantages of the invention will become more readily apparent from the following specification and drawings, wherein:

Figure 1 is a front perspective view of the novel public address unit shown mounted on an automobile window;

Figure 2 is a rear view of the unit shown in portable position;

Figure 3 is a bottom plan view of the unit;

Figure 4 is a side elevational view of the mounting chassis taken from the speaker side thereof;

Figure 5 is a fragmentary front elevational view; and

Figure 6 is a diagrammatic view showing alternative connections for battery power or automobile cigarette lighter connection.

Describing the invention in detail and having particular reference to the drawings there is shown a combination public address unit generally designated 2 which comprises a chassis 3 formed of substantially similar halves 4 and 5, the half 4 having an upright wall 6 with an inturned transverse flange 7 along its upper edge and an outwardly extending shelf 8 along its lower edge, the shelf 8 terminating along its free edge in a depending flange 9 which is provided along its lower edge with an inturned flange 10, the flanges 9 and 10 providing a foot and rubber mounting pads 12 and 13 on the flange 10.

The half 5 has an upper flange 15 which overlaps flange 7 and is connected thereto preferably as by welding, the flange 15 being formed along the upper edge of wall 16 which generally parallels wall 6 and defines an arch structure generally designated 25 or backbone therewith providing a window accommodating slot 17 which is open at its ends and bottom to receive a car window 18 therein, the window resting at its upper edge against the transverse portion 19 of the resilient or elastomer lining, the portion 19 being secured to the bight formed by the flanges 7 and 15 and the lateral or leg portions 21, 22 being secured to walls 6, 16, said walls 6 and 16 having additional strips of resilient material 23, 24 secured thereto along their lower edges.

The wall 6 is provided adjacent to its rear edge 26 (Figure 4) intermediate its upper and lower edges with a series of mounting pads 27, 27 to which is secured a stand-off mounting bracket 28 (Figure 2) which supports clamps 29, said clamps adjustable about a generally horizontal axis to position the generally conical speaker horn 30 which at its narrow end 31 is secured to the clamps 29 by a vertical bolt and nut assembly 32 to accommodate adjustment of the horn about a vertical axis to position the horn laterally, that is in a horizontal plane with respect to the wall 6 and the adjustment of the clamps determining the adjustment of the horn in a vertical plane.

It will be noted that the position as well as the shape of the horn provides a hand accommodation space at 35 to permit the user to grasp the handle 36 which extends generally horizontally and is fixed to wall 6 adjacent to the upper edge thereof intermediate its front and rear edges 37, 26.

Beneath the horn at the juncture of the wall 6 with shelf 8 and within the space 39 formed between the lower side of the horn and the corner between wall 6 and shelf 8 there is provided a rectangular battery case 39a which has an open rear end with a cover 40 provided with a plug 41 for optional connection to a plug 42 which is provided on a power line 43 connected to the amplifier or reproducing or pick-up component 44.

As best seen in Figure 6 when the unit is used as car window mounted assembly, the plug 41 connects to a plug 45 on the line 46 which has a cigarette lighter plug 47 adapted to connect to the corresponding connection 48 on the automobile dashboard.

The amplifier 44 has a rectangular case 49 which at its inner and bottom sides fits into the corner 50 formed by the wall 16 and an outstanding generally horizontal shelf 52 extending outwardly from the lower edge of wall 6, the shelf 52 being provided along its outer edge with a dependent flange 53 which has an inturned flange 54 along its lower edge, the flange 54 being perforated and mounting the resilient pads 55 and forming with flange 53 a foot structure for the corresponding side of the chassis.

The wall 16 is provided along its front and rear edges 56, 57 with L-shaped mounting brackets 58, 59, bracket 58 having a vertical portion 60 preferably weld-connected to wall 16 and an outwardly directed portion 61 overhanging the shelf 52 and bracket 59 having a vertical leg portion 62 weld-connected to wall 16 and outwardly directed generally horizontal leg portion 63 overhanging shelf 52, the portions 61 and 63 embracing the box 49 therebetween and underlying the front and rear ends 64, 65 of a cover plate 66 which forms the top of the amplifier.

The amplifier, of course, comprises various controls represented by the knobs 67, 68, 69, and 70 and has a jack structure 71 admitting the jack plug 72 at one end of a stretch cord 73 which is connected at its other end to the microphone 74 which has button 75 (Figure 4) which mounts upon the hook structure 77 mounted on the portion 61.

The wall 6 is reinforced intermediate its ends by an L-shaped bracket 78 which has a leg 79 weld-connected to wall 6 and leg 80 weld-connected to shelf 8 along the forward wall 81 of the battery case 39a.

As best seen in Figures 1, 3, and 5, there are provided releasable latches generally indicated 84 at the forward and rear ends of the unit, each latch 84 comprising an L-shaped latching member 86 having a top web 87 paralleling the coplanar shelves 8, 52 and spaced therefrom by pads 88, 89 fixed thereto, the pad 88 mounting a vertical rivet or pivot 90 which pivotally connects the latch member 86 at one end via its web 87 to shelf 52, said latch member 86 being swingable by grasping the dependent flange 91 to latching position with a catch 92 depending from pad 89 and entering the slot 93 in web 87. The latches 84 are locked when the unit is being carried by the handle to prevent spreading of the arch structure and to rigidify the same and opened as seen in Figure 1 when window mounted.

Referring to Figure 2 of the drawings, it will be seen that the speaker cord 95 which extends from the amplifier to the speaker is disposed at its intermediate length 96 to extend in the plane of the bridge part 97 of the arch structure or mounting yoke 25.

It will be appreciated that the horn may be swung outwardly from wall 6, but its mass even in this position is adequately counterbalanced because of the slightly greater weight of the amplifier structure 44.

It will be understood that the foregoing description and accompanying drawings have been chosen for the purpose of disclosing a preferred form of the invention and not as a limitation and that the scope of the invention will be readily apparent to those skilled in the art as set forth in the appended claims.

What is claimed is:

1. A combination portable and automobile car window mounted public address unit comprising a chassis having an intermediate arch structure defining a vertical window-pane-accommodation slot, a pick-up component mounted on said chassis at one side of said structure and a speaker horn mounted on the opposite side of the structure in counterbalancing relation to said component.

2. The invention according to claim 1 and further characterized in that said arch structure is of an inverted U-shape having an upper transverse bight and dependent portions, and latch means selectively interconnecting said dependent portions in rigidifying relation thereto to permit carrying of the unit through said structure.

3. The combination of a chassis comprising a flexible central inverted U-shaped yoke having an upper bight and a pair of dependent portions providing an automobile window accommodation slot, voice amplifying and reproducing means carried at opposite sides of the yoke for biasing said walls against opposite sides of the window and including a speaker horn disposed at one side of the yoke for support thereby outside of the automobile.

4. The invention according to claim 3 and handle means on said yoke for portable carrying of the unit and latch means on the chassis including members bridging said slot for rigidifying said yoke in the portable carrying position thereof.

5. The combination of a chassis having an upright inverted U-shaped yoke including an upper bight and dependent portions defining an accommodation space therein for an associated supporting part, said yoke being flexible and said portions movable toward and away with respect to said support as said support seats against said bight, and public address system components mounted on the chasis at opposite sides of the yoke and gravitationally biasing said portions toward each other in closing relation to the slot for snugly embracing said support therebetween, a support-engaging resilient lining within the slot connected to the yoke, a handle connected to one of the dependent portions and extending outwardly therefrom in cantilever relation thereto for spreading said portions attendant to mounting and demounting of the yoke with respect to the associated support, and one of said components comprising a horn of generally conical shape having a narrow end and a broad end, stand-off bracket means mounting said horn at said narrow end from the portion of the yoke mounting said handle, said horn disposed to provide hand-accommodation space between itself and said handle.

6. The combination of a chassis having a central upright arch structure defining a car window accommodation slot, a speaker horn mounted on one side of the chassis and an amplifier mounted at the opposite side of the chassis, a conduit connection between the amplifier and the speaker horn and contoured to generally follow the contour of the arch structure in non-obstructing relation to the slot, and a battery containing case mounted on the chassis below the horn between the same and the adjacent side of the arch.

7. The invention according to claim 6 and a power line connected to said amplifier and having means for optional connection to the battery or to an associated cigarette lighter connection in the associated car.

References Cited in the file of this patent

UNITED STATES PATENTS 2,612,830     Kendrick  ---------------- Oct. 7, 1952